(12) United States Patent
Anderson et al.

(10) Patent No.: US 8,080,488 B2
(45) Date of Patent: Dec. 20, 2011

(54) WOUND GLASS FILAMENT WEBS THAT INCLUDE FORMALDEHYDE-FREE BINDER COMPOSITIONS, AND METHODS OF MAKING AND APPLIANCES INCLUDING THE SAME

(75) Inventors: Stewart C. Anderson, Eden Prairie, MN (US); Wayne P. Miller, Mounds View, MN (US)

(73) Assignee: H. B. Fuller Company, St. Paul, MN (US)

( * ) Notice: Subject to any disclaimer, the term of this patent is extended or adjusted under 35 U.S.C. 154(b) by 729 days.

(21) Appl. No.: 12/045,545

(22) Filed: Mar. 10, 2008

(65) Prior Publication Data

US 2009/0226732 A1    Sep. 10, 2009

(51) Int. Cl.
 *B32B 5/26* (2006.01)
 *B32B 3/00* (2006.01)
(52) U.S. Cl. .................. 442/391; 428/172; 428/180
(58) Field of Classification Search ............ 442/391; 428/172, 180
 See application file for complete search history.

(56) References Cited

U.S. PATENT DOCUMENTS

| | | | |
|---|---|---|---|
| 2,546,230 A | 3/1951 | Modigliani | |
| 2,609,320 A | 9/1952 | Modigliani | |
| 2,644,780 A | 7/1953 | Simkins et al. | |
| 2,964,439 A | 12/1960 | Modigliani | |
| 2,984,286 A * | 5/1961 | Copenhefer | 156/157 |
| 3,072,513 A | 1/1963 | Schlarb | |
| 3,092,533 A | 6/1963 | Beckner | |
| 3,116,270 A | 12/1963 | Pennino | |
| 3,387,061 A | 6/1968 | Smith et al. | |
| 3,669,942 A | 6/1972 | Van Westrenen et al. | |
| 3,950,398 A | 4/1976 | Klein | |
| 4,077,926 A | 3/1978 | Sanderson et al. | |
| 4,157,994 A | 6/1979 | Totty et al. | |
| 4,331,438 A | 5/1982 | Pai | |
| 4,396,680 A | 8/1983 | Chang | |
| 4,435,556 A | 3/1984 | Masler, III | |
| 4,534,866 A | 8/1985 | Becker | |
| 4,621,127 A | 11/1986 | Denzinger et al. | |
| 4,743,664 A | 5/1988 | Matui et al. | |
| 4,861,539 A | 8/1989 | Allen et al. | |
| 4,936,865 A | 6/1990 | Welch et al. | |
| 4,980,433 A | 12/1990 | Chen et al. | |
| 5,028,655 A | 7/1991 | Stack | |
| 5,073,612 A | 12/1991 | Irie et al. | |
| 5,077,361 A | 12/1991 | Hughes et al. | |
| 5,137,963 A | 8/1992 | Stack | |
| 5,143,582 A | 9/1992 | Arkens et al. | |
| 5,147,956 A | 9/1992 | Allen | |
| 5,179,173 A | 1/1993 | Fong et al. | |
| 5,185,413 A | 2/1993 | Yoshinaga et al. | |
| 5,190,996 A | 3/1993 | Foran et al. | |
| 5,216,099 A | 6/1993 | Hughes et al. | |

(Continued)

FOREIGN PATENT DOCUMENTS

DE    199 49 591 A1    4/2001

(Continued)

*Primary Examiner* — Norca L Torres Velazquez
(74) *Attorney, Agent, or Firm* — Allison Johnson; Kirshen Stone

(57) ABSTRACT

A method of making a wound glass filament web, the method including forming a plurality of continuous glass filaments, winding the filaments on a drum, and contacting the filaments with an aqueous binder composition having a pH of at least 4.0 and including an aqueous carboxy functional polymer and a condensation catalyst.

32 Claims, 3 Drawing Sheets

U.S. PATENT DOCUMENTS

| | | |
|---|---|---|
| 5,219,969 A | 6/1993 | Uhl et al. |
| 5,256,746 A | 10/1993 | Blankenship et al. |
| 5,280,079 A | 1/1994 | Allen et al. |
| 5,294,686 A | 3/1994 | Fiarman et al. |
| 5,314,943 A | 5/1994 | Steinwand |
| 5,318,990 A | 6/1994 | Strauss |
| 5,340,868 A | 8/1994 | Strauss et al. |
| 5,354,803 A | 10/1994 | Dragner et al. |
| 5,376,731 A | 12/1994 | Kerr et al. |
| 5,409,571 A | 4/1995 | Togo et al. |
| 5,410,004 A | 4/1995 | Williams |
| 5,427,587 A | 6/1995 | Arkens et al. |
| 5,498,658 A | 3/1996 | Pourhmady et al. |
| 5,520,997 A | 5/1996 | Pourhmady et al. |
| 5,536,766 A | 7/1996 | Seyffer et al. |
| 5,549,852 A | 8/1996 | Bell |
| 5,578,371 A | 11/1996 | Taylor et al. |
| 5,604,291 A | 2/1997 | Kerr et al. |
| 5,661,213 A | 8/1997 | Arkens et al. |
| 5,667,848 A | 9/1997 | Wuestefeld et al. |
| 5,670,585 A | 9/1997 | Taylor et al. |
| 5,691,432 A | 11/1997 | Williams |
| 5,693,707 A | 12/1997 | Cheng et al. |
| 5,695,848 A | 12/1997 | Wilkins et al. |
| 5,705,475 A | 1/1998 | Tang et al. |
| 5,718,728 A | 2/1998 | Arkens et al. |
| 5,728,771 A | 3/1998 | Tang et al. |
| 5,753,746 A | 5/1998 | Rupaner et al. |
| 5,763,524 A | 6/1998 | Arkens et al. |
| 5,840,822 A | 11/1998 | Lee et al. |
| 5,858,549 A | 1/1999 | Kielbania, Jr. et al. |
| 5,866,664 A | 2/1999 | McCallum, III et al. |
| 5,891,972 A | 4/1999 | Egraz et al. |
| 5,919,716 A | 7/1999 | Raynolds et al. |
| 5,932,665 A | 8/1999 | DePorter et al. |
| 5,932,689 A | 8/1999 | Arkens et al. |
| 5,935,689 A | 8/1999 | Foley et al. |
| 5,977,224 A | 11/1999 | Cheung et al. |
| 5,977,232 A | 11/1999 | Arkens et al. |
| 6,051,646 A | 4/2000 | Nass et al. |
| 6,063,498 A | 5/2000 | Licht et al. |
| 6,063,884 A | 5/2000 | Egraz et al. |
| 6,071,434 A | 6/2000 | Davis et al. |
| 6,071,994 A | 6/2000 | Hummerich et al. |
| 6,099,773 A | 8/2000 | Reck et al. |
| 6,103,789 A | 8/2000 | Marciandi et al. |
| 6,114,464 A | 9/2000 | Reck et al. |
| 6,136,916 A | 10/2000 | Arkens et al. |
| 6,139,916 A | 10/2000 | Saruhan-Brings et al. |
| 6,146,746 A | 11/2000 | Reck et al. |
| 6,171,654 B1 | 1/2001 | Salsman et al. |
| 6,184,321 B1 | 2/2001 | Egraz et al. |
| 6,194,512 B1 | 2/2001 | Chen et al. |
| 6,221,973 B1 | 4/2001 | Arkens et al. |
| 6,241,780 B1 | 6/2001 | Arkens et al. |
| 6,262,159 B1 | 7/2001 | Dreher et al. |
| 6,274,661 B1 | 8/2001 | Chen et al. |
| 6,297,336 B1 | 10/2001 | Shioji et al. |
| 6,299,936 B1 | 10/2001 | Reck et al. |
| 6,309,565 B1 | 10/2001 | Stowell et al. |
| 6,331,350 B1 | 12/2001 | Taylor et al. |
| 6,335,406 B1 | 1/2002 | Nagasuna et al. |
| 6,348,530 B1 | 2/2002 | Reck et al. |
| 6,380,353 B1 | 4/2002 | Rupaner et al. |
| 6,395,813 B1 | 5/2002 | Duccini et al. |
| 6,399,694 B1 | 6/2002 | McGrath et al. |
| 6,410,647 B1 | 6/2002 | Yoshioka et al. |
| 6,444,750 B1 | 9/2002 | Touhsaent |
| 6,472,478 B1 | 10/2002 | Funk et al. |
| 6,489,287 B1 | 12/2002 | Gauthier et al. |
| 6,582,476 B1 | 6/2003 | Binder et al. |
| 6,585,780 B2 | 7/2003 | Koola et al. |
| 6,585,933 B1 | 7/2003 | Ehrhardt et al. |
| 6,596,386 B1 | 7/2003 | Reck et al. |
| 6,599,997 B2 | 7/2003 | Araki et al. |
| 6,699,945 B1 | 3/2004 | Chen et al. |
| 6,730,729 B2 | 5/2004 | Gerst et al. |
| 6,753,361 B2 | 6/2004 | Kroner et al. |
| 6,984,675 B2 | 1/2006 | Lesley et al. |
| 2002/0091185 A1 | 7/2002 | Taylor et al. |
| 2002/0130439 A1 | 9/2002 | Kroner et al. |
| 2003/0236043 A1 | 12/2003 | Calzavara et al. |
| 2004/0115429 A1 | 6/2004 | Michl et al. |
| 2004/0122166 A1* | 6/2004 | O'Brien-Bernini et al. ............ 525/54.31 |
| 2008/0202078 A1* | 8/2008 | Healey et al. ............ 55/341.1 |

FOREIGN PATENT DOCUMENTS

| | | |
|---|---|---|
| EP | 0 651 088 A1 | 5/1995 |
| EP | 0 583 086 B1 | 11/1997 |
| EP | 0 964 026 A1 | 12/1999 |
| EP | 0 990 729 A1 | 4/2000 |
| WO | WO 99/64505 A1 | 12/1999 |

* cited by examiner

WOUND GLASS FILAMENT WEBS THAT INCLUDE FORMALDEHYDE-FREE BINDER COMPOSITIONS, AND METHODS OF MAKING AND APPLIANCES INCLUDING THE SAME

BACKGROUND

The invention relates to forming a wound glass filament web from a formaldehyde-free binder composition that includes carboxy functional polymer.

Wound glass filament webs formed from continuous or substantially continuous filaments are used in a variety of applications including insulation (e.g., thermal and acoustic), filters (e.g., air filters, furnace filters, air conditioner filters and oven range filters), sky light diffusion, and glass filament reinforced plastics. For many applications, it is important that the web exhibit uniform functional properties across its major surfaces. If the web includes rips, tears or openings created by tearing and ripping, the functional properties of the web may not be uniform or may be impaired. For most applications, it is necessary to have a web that is free from tears and rips in order for the web to exhibit performance properties suitable for the intended application and to minimize waste due to poor quality.

Many wound glass filament web manufacturing processes involve exerting stretching and pulling forces on the web while the web is in a wet state so as to achieve an expanded web. The stretching operation can cause the web to rip or tear and render the web unsuitable for its intended purpose.

Wound glass filament webs formed from continuous or substantially continuous filaments have been made using a variety of binder compositions including polyvinyl alcohol, polyester, latex polymer, and formaldehyde (e.g., urea, melamine, and phenol formaldehyde)-based binder compositions. In the case of formaldehyde-based binder compositions, when the glass filament web is heated to cure the binder composition, formaldehyde derived compounds are volatilized from the composition and into the surrounding environment, which is undesirable for the people working around the web manufacturing process and may be harmful to the environment.

Wound glass filament webs differ from what is commonly referred to as fiberglass insulation in that fiberglass insulation is often made by pneumatically conveying discontinuous glass fibers formed from molten attenuated glass.

SUMMARY

In one aspect, the invention features a method of making a wound glass filament web, the method including forming a plurality of continuous glass filaments, winding the filaments on a rotating drum to form multiple layers of the continuous glass filaments, and contacting the filaments with an aqueous binder composition that has a pH of at least 4.0 and includes an aqueous carboxy functional polymer and a condensation catalyst. In one embodiment, the carboxy functional polymer further includes hydroxy functionality. In other embodiments the binder composition further includes at least one of a polyol, a hydroxy functional amine, and a polyamine.

In some embodiments the binder composition includes from 15% solids to 65% solids and exhibits a viscosity of from 10 centipoise to 2,000 centipoise at 25° C. In some embodiments, the binder composition has a pH of from 4.0 to 6. In other embodiments, the binder composition has a pH of from 4.2 to about 5.5.

In another embodiment the method further includes cutting the layers of filaments and removing the filaments from the drum in the form of a web. In other embodiments, the method further includes stretching the web such that the web is expanded to an extent that is at least 20 times its original width, the web being free of rips and tears after stretching. In some embodiments the method further includes stretching the web, in a direction transverse to the orientation of a majority of the filaments, to form an expanded web.

In one embodiment the carboxy functional polymer includes the reaction product of a carboxy functional monomer and a hydroxy functional monomer. In other embodiments the carboxy functional polymer includes the reaction product of at least 5% by weight $\alpha,\beta$-ethylenically unsaturated hydroxy functional monomer, at least 30% by weight ethylenically unsaturated carboxylic acid monomer, from 0% by weight to less than 50% by weight water insoluble $\alpha,\beta$-ethylenically unsaturated nonhydroxy functional, noncarboxy functional monomer, and chain transfer agent, and a condensation catalyst.

In another aspect, the invention features a wound glass filament web that includes a plurality of layers of glass filaments formed from continuous glass filaments, and a dried binder composition in contact with the fiberglass filaments and disposed throughout the layers of filaments, the binder composition including an acrylo-polyester thermosetting resin, the wound glass filament web being free from tears and rips. In one embodiment a majority of the glass filaments extend across a major portion of a major dimension of the web. In another embodiment at least one of insulation, a filter, glass filament reinforced plastic and a skylight light diffuser includes the wound glass filament web disclosed herein.

In one embodiment the invention features a filter that includes a support (e.g., a frame) and a wound glass filament web disclosed herein maintained in a fixed position by the support. In some embodiments the filter further includes a scrim in facing relation with the web.

In other embodiments, the invention features an appliance that includes an air passageway and a filter that includes a wound glass filament web positioned such that air passing through the air passageway contacts the web. In some embodiments the appliance further includes a furnace, an air purifier, an air conditioner, an oven range hood, a stove hood, a range hood, or a laboratory hood.

In another aspect, the invention features a wound glass filament web that includes a plurality of layers of wound glass filaments formed from continuous glass filaments, and an aqueous binder composition in contact with the glass filaments, the binder composition having a pH of at least 4.0 and including an aqueous carboxy functional polymer and a condensation catalyst.

In other aspects, the invention features a method of making a wound glass filament web, the method including adjusting the pH of a binder composition that includes a carboxy functional polymer to a pH of at least 4.0, and contacting substantially continuous glass filaments with the binder composition.

The invention features a method of making a wound glass filament web using a binder composition that includes a carboxy functional polymer that produces an expanded web that is free from tears and rips. The binder composition, when applied to continuous glass filaments as they are wound upon a rotating drum, allows a wet web formed therefrom to be stretched to many times its original extent in the x and y directions without tearing or ripping. The expansion of the fibers in the x and y directions allows the fibers freedom of movement to expand in the z direction. The aqueous binder composition also exhibits sufficient humectancy, hygroscopicity and lubricity to enable the glass filaments in a wound glass filament web containing the aqueous binder composition to move unhindered relative to one another during stretching.

The invention also features a binder composition that is free of formaldehyde and that can be used in the manufacture of wound continuous glass filament webs to produce webs that are free of formaldehyde and that do not generate formaldehyde upon drying. The binder composition can also be formulated to produce a web that is free of discoloration such as yellowing after cure and upon aging.

Other features and advantages will be apparent from the following description of the drawings and the preferred embodiments and from the claims.

GLOSSARY

In reference to the invention, these terms have the meanings set forth below:

The phrase "substantially continuous glass filaments" refers to a number of glass filaments, the majority of which are continuous.

The phrase "wound glass filament web" refers to a web formed from multiple layers of substantially continuous glass filaments wound on a rotating drum.

DETAILED DESCRIPTION

Figure 1:
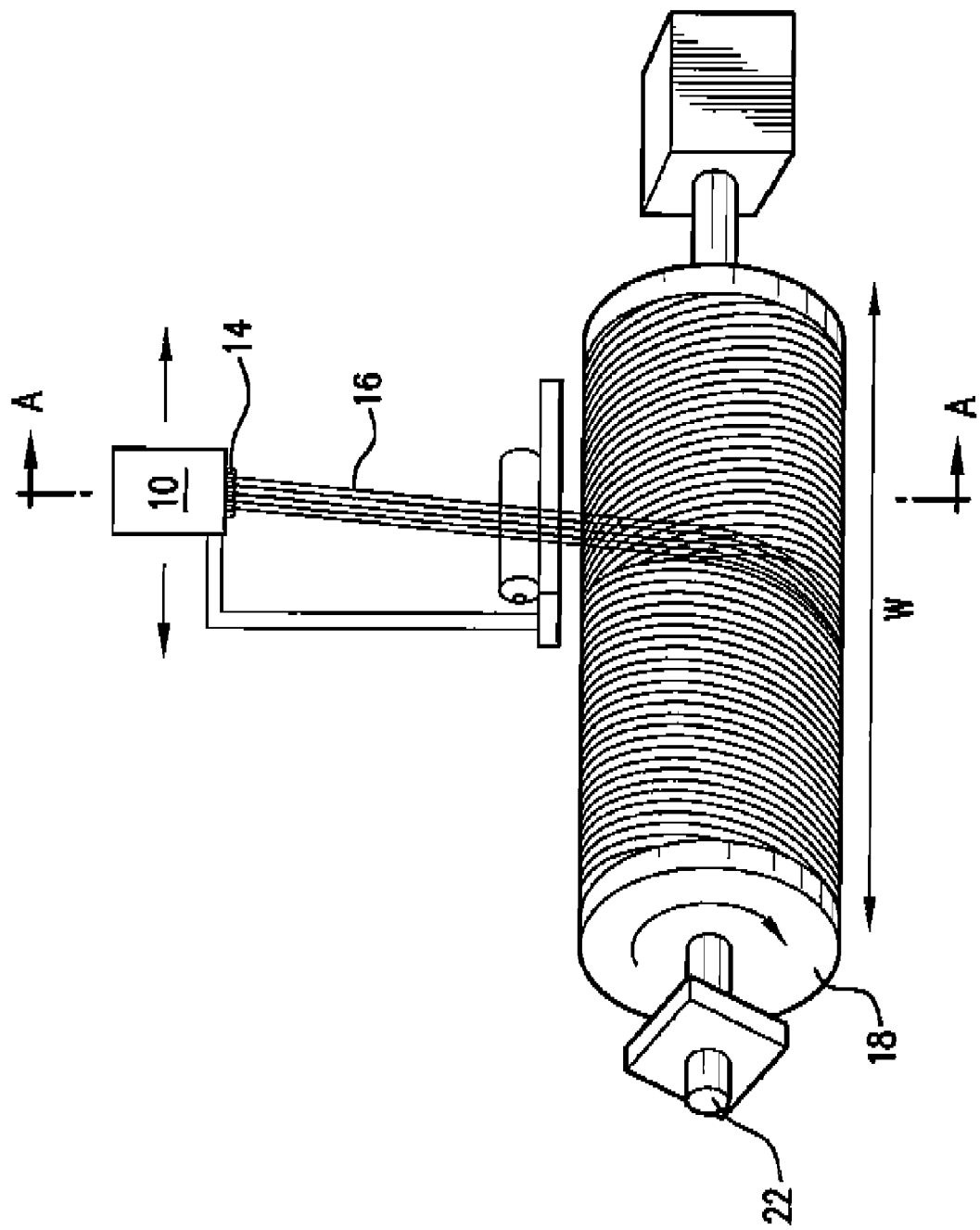
FIG. 1 is a schematic view of a continuous filament winding process.

The wound glass filament web is prepared by forming a number of continuous glass filaments, contacting the filaments with an aqueous binder composition that includes a carboxy functional polymer and has a pH of at least 4.0, and winding the filaments on a rotating drum to produce a condensed web that includes multiple layers of substantially continuous glass filaments and aqueous binder composition. The filaments can be contacted with the binder composition prior to, during or after being wound on a rotating drum or a combination thereof. When the desired number of layers of substantially continuous glass filaments (i.e., the thickness or number of windings) and binder have accumulated on the drum, the accumulated layers of filaments and aqueous binder form what is referred to as a condensed web, which is then cut longitudinally to form a web having a length that is approximately equal to the circumference of the drum. The web is removed from the drum, expanded (e.g., by stretching) to an extent that is many times its original width, and then heated to effect drying and curing of the binder composition. As the web dries, it can gain additional loft.

The resulting wound glass filament nonwoven web includes layers of continuous or substantially continuous glass filaments. Preferably the filaments of each layer are approximately parallel with each other. In some embodiments, the filaments of adjacent layers cross each other at relatively acute angles, i.e., the filaments lie at a sufficient angle to the longitudinal extent so as to cross the filaments of the adjacent layers. The layers of glass filaments are in an essentially consistent and repeating spatial orientation to one another in the finished web and the web exhibits a substantially uniform porosity, e.g., the web is free of tears and rips. A majority of the glass filaments of the web initially have a length of approximately the circumference of the drum on which the web was made. A majority of the glass filaments also preferably extend continuously or substantially continuously across a major extent of at least one major dimension of the web. The continuous glass filaments can impart tensile strength, structural integrity and retention of shape (e.g., resiliency) to the web. The continuous glass filaments can have any dimension suitable for the intended use of the web. Useful continuous glass filaments can have any suitable length including, e.g., lengths of at least 8 inches, at least 10 inches, at least 18 inches, or even at least 30 inches.

The condensed web can be expanded through stretching to achieve any desired level of loft including, e.g., high loft. One useful measure of loft is the height of the web. Suitable expanded webs have a loft of at least about 0.5 inch, at least 3 inches, no greater than about 30 inches, no greater than 20 inches, no greater than 10 inches or even from about 4 inches to about 8 inches. Other properties that assist in characterizing the web include basis weight, density and color. Useful webs preferably exhibit a water white color and have any suitable basis weight including a basis weight of at least about 5 grams per square meter ($g/m^2$), at least about 10 $g/m^2$, or even at least about 15 $g/m^2$. Wound glass filament webs often exhibit high loft and are referred to as "battings".

The expanded web is also preferably resilient in that it springs back to its original form after an applied pressure is released. One useful measure of resiliency is compression recovery. The webs can be constructed and expanded to exhibit any desired compression recovery. The expanded web also preferably exhibits good steam resistance, i.e., it does not fall apart after having been exposed to steam or a high humidity environment (i.e., at least 70% humidity).

The binder composition in the expanded web is interspersed with the filaments. The binder composition preferably exerts its binding action at the interstices of the glass filaments to bind the filaments together at these junctures. The dried expanded web preferably includes a sufficient amount of binder composition to function successfully in the intended application. One useful measure of the amount of binder composition present in a web is Loss on Ignition (LOI). Expanded webs can exhibit any suitable LOI including, e.g., at least 5%, at least about 10%, at least about 15%, at least about 30%, at least about 40%, or even from about 15% to about 40%.

Aqueous Binder Composition

The binder composition in the wound glass filament web is the condensation product of an aqueous composition that has a pH of at least 4.0 and preferably no greater than 6, and includes a carboxy functional polymer, a condensation catalyst, and optionally at least one active hydrogen compound (e.g., a polyol, a hydroxy functional amine, and a polyamine). The aqueous binder composition preferably exhibits a pH of at least 4.0, from 4.0 to no greater than 6, from 4.1 to about 5.5, from 4.1 to about 5.2, or even from 4.2 to about 5. The present inventors have made the surprising discovery that when the pH of the binder composition is at least 4.0, the amount of base present in the composition is sufficient to impart a level of lubricity to the wound glass filaments of the wet, pre-expanded web that enables the wound glass filaments to move effectively and unhindered relative to one another when a transverse force is applied to the wet, pre-expanded web. As a result, the web does not experience tearing or ripping when the force (i.e., a stretching force) is applied. The fibers also preferably move uniformly and homogenously when the force is applied. The nature of this movement allows the wet web to be stretched without tearing and ripping. The binder composition also preferably has a pH of no greater than 6 so as to impart water and steam resistance to the resulting expanded web. The expanded web exhibits steam resistance if, when exposed to steam, it does not fall apart or condense upon itself.

The binder composition also preferably exhibits a solids content of from about 30% to about 65%, or even from about 50% to about 60%, and a Brookfield viscosity of from 10 centipoise (cps) to about 3000 cps, 100 cps to about 2000 cps, or even from about 300 cps to about 600 cps at a temperature of 25° C.

Aqueous Carboxy Functional Polymer

The aqueous carboxy functional polymer of the binder composition includes carboxy functionality in the form of carboxyl groups, anhydride groups, salts of the aforementioned groups, or combinations thereof, and optionally includes hydroxy functionality, amine functionality, glycidyl functionality, or a combination thereof. Useful carboxy functional polymers include, e.g., polyacids formed from carboxy functional monomers; active hydrogen functional, carboxy functional polymers formed from carboxy functional polymer, carboxy functional monomer or a combination thereof, and at least one active hydrogen compound; and combinations thereof.

Polyacids and active hydrogen functional, carboxy functional polymers can be formed from a variety of carboxy functional monomers including, e.g., acrylic acid, glacial acrylic acid, methacrylic acid, isooctyl acrylic acid, crotonic acid, isocrotonic acid, fumaric acid, cinnamic acid, maleic acid, 2-methyl maleic acid, itaconic acid, 2-methyl itaconic acid, α,β-methylene glutaric acid, monoalkyl maleates, monoalkyl fumarates, methacrylic anhydride, isooctyl acrylic anhydride, crotonic anhydride, fumaric anhydride, maleic anhydride and combinations thereof, polymers of the aforementioned monomers, and combinations thereof, using any suitable technique including suspension polymerization, emulsion polymerization, aqueous and non-aqueous dispersion polymerization, and solution polymerization techniques.

Active hydrogen functional, carboxy functional polymers additionally are formed from a variety of active hydrogen compounds including compounds having at least one active hydrogen group including, e.g., hydroxyl, primary amino, and secondary amino groups. Examples of useful active hydrogen compounds include monohydroxy and polyhydroxy functional monomers including, e.g., α,β-ethylenically unsaturated monohydroxy functional monomers (e.g., hydroxy alkyl acrylate monomers including, e.g., hydroxy methyl acrylate, hydroxy ethyl acrylate, 2-hydroxy ethyl acrylate, hydroxy propyl acrylate, hydroxy butyl acrylate, and hydroxy alkyl methacrylates), α,β-ethylenically unsaturated polyhydroxy monomers (e.g., polyethylene glycol monomethacrylate), and combinations thereof); and compounds that include at least two active hydrogen compounds including, e.g., polyols (e.g., ethylene glycol, polyethylene glycol, polypropylene glycol, glycerol, pentaerythritol, trimethylol propane, sorbitol, sucrose, glucose, resorcinol, catechol, pyrogallol, glycollated ureas, 1,4-cyclohexane diol, diethanolamine, and triethanolamine), and reactive polyols including, e.g., β-hydroxyalkylamides (e.g., bis-[N,N-di(.beta.-hydroxyethyl)]adipamide), homopolymers and copolymers of hydroxyethyl (meth)acrylate, hydroxypropyl (meth)acrylate, dimethylaminoethyl methacrylate, dimethylaminopropyl methacrylamide, and combinations thereof. Active hydrogen functional, carboxy functional polymers can be formed using any suitable technique including emulsion polymerization, suspension polymerization, aqueous and non-aqueous dispersion polymerization, and solution polymerization.

Condensation Accelerator

The condensation accelerator of the binder composition accelerates the condensation reaction that occurs between the hydroxy functional groups and the carboxy functional groups. Suitable condensation accelerators include, e.g., phosphorous-based catalysts including, e.g., hypophosphorous acid and its salts (e.g., sodium hypophosphite and potassium hypophosphite) and phosphoric acid and its salts, para-toluene sulfonic acid, any strong acids including, e.g., hydrochloric acid, sulfuric acid, trichloroacetic acid, and e.g., acidic metal salts including, e.g., aluminum chloride, iron chloride, zirconium oxychloride, chromic nitrate, chromic perchlorate, aluminum nitrate, iron nitrate, zinc nitrate, titanates, and combinations thereof.

The condensation accelerator is present in the binder composition in an amount no greater than 15% by weight, preferably from 3% by weight to about 8% by weight based on solids.

The pH of the binder composition is adjusted with any suitable base to achieve a pH of at least 4.0. Any suitable based can be used to adjust the pH of the binder composition to the desired pH including, e.g., any alkaline material including, e.g., sodium hydroxide, potassium hydroxide, ammonium hydroxide, ammonia, amines, and combinations thereof.

Optional Active Hydrogen Compound

The binder composition optionally includes a compound that includes at least two active hydrogen groups including, e.g., polyols, hydroxy functional amines, polyamines and combinations thereof. Suitable active hydrogen compounds include, e.g., ethylene glycol, polyethylene glycol, polypropylene glycol, glycerol, pentaerythritol, trimethylol propane, sorbitol, sucrose, glucose, resorcinol, catechol, pyrogallol, glycollated ureas, 1,4-cyclohexane diol, diethanolamine, and triethanolamine, reactive polyols including, e.g., β-hydroxyalkylamides (e.g., bis-[N,N-di(.beta.-hydroxyethyl)]adipamide), homopolymers and copolymers of hydroxyethyl (meth) acrylate, hydroxypropyl (meth)acrylate, dimethylaminoethyl methacrylate, dimethylaminopropyl methacrylamide, and combinations thereof.

The aqueous binder composition can also include other components including, e.g., free radical initiators, emulsifiers, surfactants, pigments, fillers, biocides, antimycotics including, e.g., fungicides and mold inhibitors, plasticizers, anti-foaming agents, colorants, waxes, antioxidants, adhesion promoting agents including, e.g., silanes and boranes, odor masking agents, and combinations thereof.

The aqueous binder composition is essentially free of (i.e., has less than 10,000 parts per million (ppm)), and preferably is free of, formaldehyde.

The aqueous binder composition preferably includes at least about 10%, at least about 40% by weight, at least about 50% by weight, no greater than about 75% by weight, no greater than about 70% by weight, or even from about 45% by weight to 65% by weight solids.

One example of a useful binder composition includes an aqueous hydroxy functional, carboxy functional polymer that includes the reaction product of α,β-ethylenically unsaturated hydroxy monomer, ethylenically unsaturated carboxylic acid monomer, chain transfer agent, free radical initiator, and optionally a condensation accelerator. The aqueous hydroxy functional, carboxy functional polymer can be in the form of a solution, dispersion, emulsion or suspension. The aqueous hydroxy functional, carboxy functional polymer preferably is water soluble and preferably is prepared by free radical addition polymerization. Other suitable polymerization techniques include, e.g., emulsion polymerization and suspension polymerization techniques. For emulsion polymerization, anionic surfactants, nonionic surfactants and combinations thereof can be used. Preferably the aqueous hydroxy functional, carboxy functional polymer is a random copolymer.

The aqueous hydroxy functional, carboxy functional polymer preferably has a weight average molecular weight (Mw) of at least about 500 g/mole, at least 2500 g/mole, no greater than 10,000,000 g/mole, less than 250,000 g/mole, less than about 15,000 g/mole, less than about 7,000 g/mole, less than about 5,000 g/mole, or even from about 2500 g/mole to about 7000 g/mole.

Suitable α,β-ethylenically unsaturated hydroxy functional monomers for use in preparing the hydroxy functional, carboxy functional polymer include, e.g., α,β-ethylenically unsaturated monohydroxy functional monomers (e.g., hydroxy alkyl acrylate monomers including, e.g., hydroxy methyl acrylate, hydroxy ethyl acrylate, 2-hydroxy ethyl acrylate, hydroxy propyl acrylate, hydroxy butyl acrylate, and hydroxy alkyl methacrylates), α,β-ethylenically unsaturated polyhydroxy monomers (e.g., polyethylene glycol monomethacrylate), and combinations thereof. The aqueous hydroxy functional, carboxy functional polymer is preferably prepared from α,β-ethylenically unsaturated hydroxy functional monomer in an amount of at least 5% by weight, 10% by weight, at least 20% by weight, at least 25% by weight, greater than 75% by weight, no greater than 50% by weight, or even no greater than 45% by weight.

Suitable α,β-ethylenically unsaturated carboxylic acid monomers for use in preparing the hydroxy functional, carboxy functional polymer include, e.g., acrylic acid, glacial acrylic acid, methacrylic acid, isooctyl acrylic acid, crotonic acid, isocrotonic acid, fumaric acid, cinnamic acid, maleic acid, 2-methyl maleic acid, itaconic acid, 2-methyl itaconic acid, α,β-methylene glutaric acid, monoalkyl maleates, monoalkyl fumarates, methacrylic anhydride, isooctyl acrylic anhydride, crotonic anhydride, fumaric anhydride, maleic anhydride and combinations thereof. The hydroxy functional, carboxy functional polymer is preferably prepared from at least 30% by weight, at least 40% by weight, at least 50% by weight, at least 60% by weight, or even at least 65% by weight, less than 100% by weight, no greater than 98% by weight, no greater than 90% by weight, no greater than 80% by weight, or even no greater than 75% by weight α,β-ethylenically unsaturated carboxy functional monomer.

Suitable chain transfer agents include, e.g., hypophosphorous acid and its salts (e.g., sodium hypophosphite and potassium hypophosphite), thioglycolic acid, mercaptans including, e.g., primary octyl mercaptan, 2-mercaptoethanol, n-dodecylmercaptan, n-octylmercaptan, t-dodecyl mercaptan, mercaptoethanol, iso-octyl thioglycolurate, mercapto carboxylic acids having 2 to 8 carbon atoms, and their esters, examples of which include 3-mercapto propionic acid and 2-mercapto propionic acid, halogenated hydrocarbons including, e.g., carbonbromo compounds (e.g., carbon tetrabromide and bromotrichloromethane) and combinations thereof. The chain transfer agent can be present in the mixture used to form the hydroxy functional, carboxy functional polymer in an amount no greater than about 20% by weight, no greater than about 10% by weight, from 1% by weight to about 10% by weight, or even from about 2% by weight to about 8% by weight based on the monomer weight.

Suitable free radical initiators include oxidizing agents including, e.g., water-soluble peroxy compounds such as hydrogen peroxide, t-butyl-hydroperoxide, di-t-butyl peroxide, cumene hydroperoxide, acetylacetone peroxide, t-butyl perneodecanoate, t-butyl perneohexanoate, t-butyl per-2-ethylhexanoate, t-butyl perbenzoate, t-butyl perpivalate, t-butyl pivalate, t-amyl perpivalate, di-t-butyl peroxide, dibenzoyl peroxide, dicyclohexyl peroxodicarbonate, dibenzoyl peroxodicarbonate, dilauroyl peroxide, methyl ethyl ketone peroxide; water-soluble inorganic persulphates including, e.g., ammonia persulfate, lithium persulfate, potassium persulfate and sodium persulfate; water-soluble azo compounds including, e.g., 4,4'-azobis(4-cyanovaleric acid) and its salts, azodiisobutyronitrile, 2,2'-azobis(2-amidinopropane)dihydrochloride, and 2-(carbamoylazo)isobutyonitrile, and combinations thereof.

The free radical initiator can be present in the reaction mixture used to form the hydroxy functional, carboxy functional polymer in an amount no greater than 10% by weight based on the weight of the monomer(s) charged to the reaction vessel.

The free radical initiator can be part of an initiator system that includes oxidizing agent and reducing agent. Suitable reducing agents include, e.g., sodium formaldehyde-sulfoxylate, ferrous salts, sodium dithionite, sodium hydrogen sulfite, sodium sulfite, sodium thiosulfate, sodium bisulphate, ascorbic acid, erythorbic acid and the sodium salts of ascorbic acid and erythorbic acid, and combinations thereof. Useful commercially available reducing agents are available under the BRÜGGOLITE series of trade designations from Brüggemann Chemical (Germany), one suitable example of which is BRÜGGOLITE FF6 sodium salt of an organic sulfinic acid derivative.

The initiator system can also include a transition metal catalyst including, e.g., salts of iron, cobalt, nickel, copper, vanadium and manganese. Examples of suitable catalysts include iron (II) sulfate, cobalt (II) chloride, nickel (II) sulfate, copper (I) chloride, and combinations thereof.

The amount of the initiator system used in the reaction mixture (i.e. including the oxidizing agent and, where present, reducing agent and catalyst) is from 0.01% by weight to 5% by weight based on the weight of the monomer(s) charged to the reaction vessel.

The reaction mixture from which the hydroxy functional, carboxy functional polymer is prepared is preferably free of α,β-ethylenically unsaturated nonhydroxy functional, noncarboxy functional monomer, i.e., α,β-ethylenically unsaturated monomer that does not include at least one of a hydroxy functional group and a carboxy functional group, more preferably free of water insoluble α,β-ethylenically unsaturated nonhydroxy functional, noncarboxy functional monomer. When present, the α,β-ethylenically unsaturated nonhydroxy functional, noncarboxy functional monomer is preferably present in the reaction mixture in an amount of less than 50% by weight, less than 40% by weight, less than 25% by weight, or even less than 5% by weight, based on the weight of the resulting hydroxy functional, carboxy functional polymer, and preferably is water soluble.

Another useful binder composition includes an aqueous carboxy functional polymer that includes the reaction product of ethylenically unsaturated carboxylic acid polymer, an active hydrogen compound, chain transfer agent, free radical initiator, and optionally a condensation catalyst. Examples of suitable ethylenically unsaturated carboxylic acid polymers, active hydrogen compounds, chain transfer agents, free radical initiators and condensation catalysts are set forth above and incorporated herein. Other examples of suitable binder compositions that include carboxy functional polymer, polyol and a condensation catalyst and that can be adjusted to have a pH of at least 4.0, from 4.0 to no greater than 6, from 4.1 to about 5.5, from 4.1 to about 5.2, or even from 4.2 to about 5, include those compositions described, e.g., in U.S. Pat. Nos. 5,661,213, 5,718,728, 6,136,916, 6,221,973, 6,241,780, and 6,221,350 and incorporated herein.

Other useful binder compositions that can be adjusted to have a pH of at least 4.0, from 4.0 to no greater than 6, from 4.1 to about 5.5, from 4.1 to about 5.2, or even from 4.2 to about 5, are described in U.S. Pat. Nos. 7,141,626 and 6,699,945 and incorporated herein.

Figure 2:
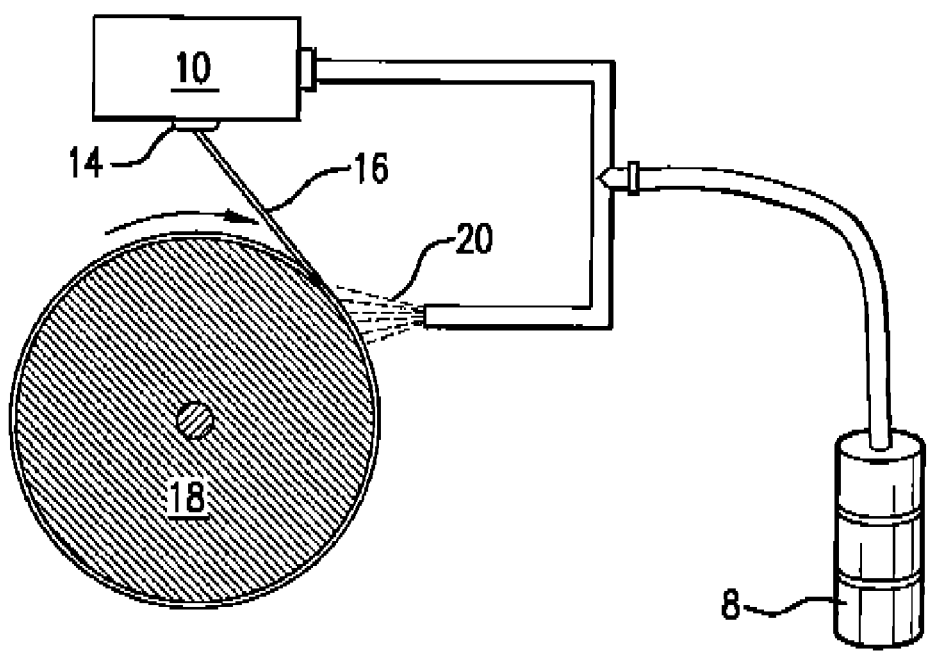
FIG. 2 is a cross sectional view taken along line A-A of the process of FIG. 1

There are a number of processes by which the wound continuous glass filament web can be formed. In one method, a melting furnace 10 feeds molten glass to orifices 14, through which are discharged fine glass filaments 16, as illustrated in FIGS. 1 and 2. The glass filaments 16, in turn, are wrapped circumferentially around a rotating drum 18 that has been wrapped in a polyethylene film. The binder composition 20 is fed from a reservoir 8 and applied to the surface of the filaments 16 while the filaments 16 are being wound on the rotating drum 18. The layers of filaments 16 overlap as they are wound on the drum and build up on each other during the winding operation. Alternatively or in addition, the binder composition can be deposited on the filaments prior to the filaments being wound on the drum (not shown). The binder composition can be applied to the glass filaments using any suitable technique including, e.g., misting, spraying, brush coating, roll coating, curtain coating, pouring and combinations thereof, to size, coat, saturate, imbue, or a combination thereof, the filaments with binder composition. One example of a useful roll coating method is disclosed in U.S. Pat. No. 7,000,435 and incorporated herein.

Figure 3:
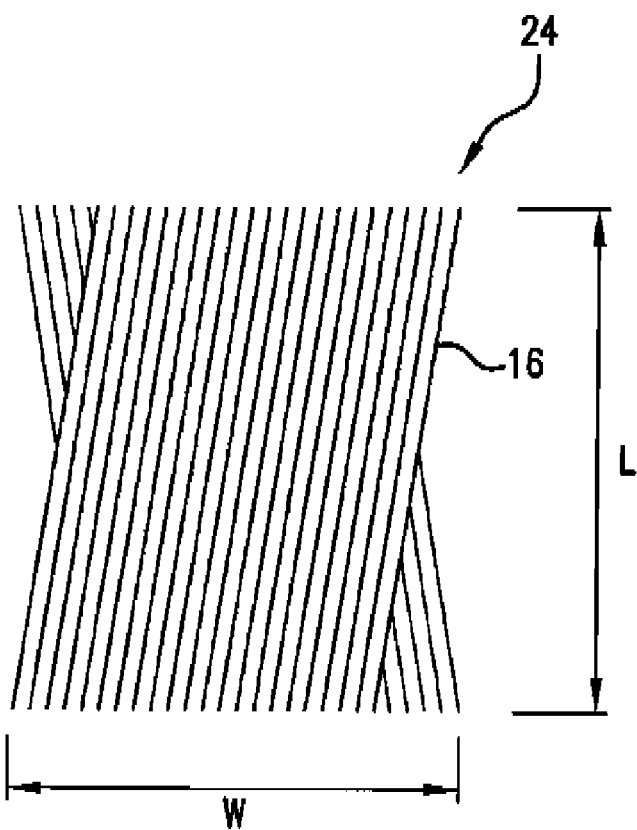
FIG. 3 is plan view of a wound glass filament web.

The furnace 10 and the orifices 14 move longitudinally along the length of the rotating drum 18 during the web formation process. The translational movement of the furnace 10 relative to the drum 18 is relatively slow and the rotation of the drum 18 is relatively fast to allow for a build up of a number of layers of glass filaments 16. After the desired number of layers of filaments 16 have accumulated on the drum 18, the desired weight of filaments 16 and binder 20 has accumulated on the drum 18, or the desired thickness has been achieved, the condensed web 24 is cut longitudinally, removed from the drum 18 and spread out as a flat sheet on a surface, as shown in FIG. 3. The majority of the glass filaments 16 in the condensed web 24 have a length that is approximately equal to the circumference of the drum 18, the outer layers having a majority of filaments having a length that is relatively longer than the length of the filaments of the inner layers. The number of filaments corresponds to the number of filaments emitted from the furnace bushing and the number of winds of those filaments around the circumference of the drum.

Figure 4:
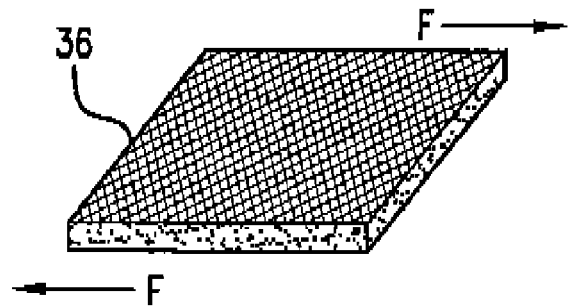
FIG. 4 is a schematic view of a wound glass filament web.

The cut condensed web 24 is generally rectangular in shape and a majority of the filaments are continuous and extend across at least a major portion of a major dimension (e.g., the width) of the web 24. The condensed web 24 is then stretched to expand the web. Alternatively, the condensed web can be stored for a period of time, e.g., from 0 to 48 hours before undergoing expansion. FIG. 4 illustrates an expanded web 36 resulting from the stretching of a condensed web in a direction substantially perpendicular to the original lay of the filaments. The web can be stretched using any suitable technique in any desired direction relative to the longitudinal extent of a majority of the glass filaments. In one stretching process, at least one edge of the web is pulled with a force (F) in a first direction (e.g., a direction perpendicular, transverse or oblique to a longitudinal extent of a major portion of the glass filaments), while the opposite edge is either pulled with a force (F) in the opposite direction or maintained in place to elongate the web through stretching. Stretching expands the web by increasing the width of the web and also imparting some vertical loft to the web.

Figure 5:
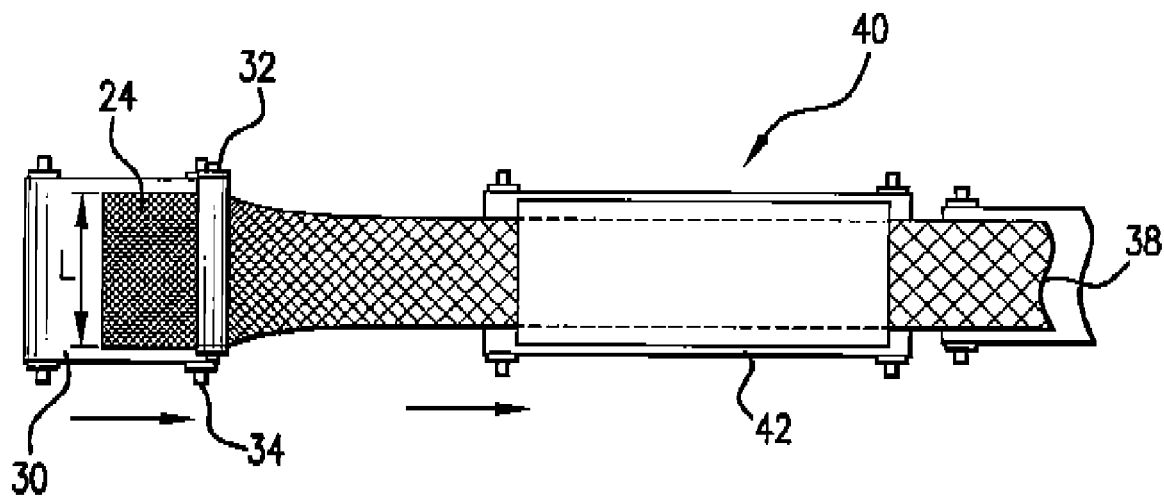
FIG. 5 is a plan view of one embodiment of an expanded wound glass filament web forming process.

FIG. 5 illustrates a web expanding process in which the condensed web 24 is placed on a platform 30, which is associated with a conveyor belt 42 that moves longitudinally at a relatively slow pace. The web 24 is positioned on the platform 30 such that the longitudinal extent of a majority of the filaments generally extends across the width of the web 24 and the width (w) of the web is generally transverse to the direction of movement (shown by the arrow) of the conveyor belt 42. At the exit end of the conveyor belt 42, a retarding roller 32 presses the condensed web 24 against the platform 30, which is supported by an oppositely rotating support roller 34. The retarding roller 32 and the supporting roller 34 combine to function as holdback rollers. When the expanding web exits the pinch area between the rollers 32, 34, the web fluffs vertically, necks down to a narrower width, and expands in a longitudinal direction. The leading end 38 of the condensed web 24 beyond the retarding roller 32 is stretched or expanded longitudinally to many times the original length of the condensed web 24. The expanding is a continuing process with the leading end being pulled longitudinally while the confining-retarding rollers 32, 34 minimize the forward movement of the remaining condensed web. The web can be expanded longitudinally any desired amount including at least 50 times, at least 80 times, at least 100 times, or even at least 500 times the original length of the condensed web. During the heating and curing process, the web will expand in the Z' direction to form a nonwoven batting characterized by resilient loft and can be expanded to at least about 4 times, at least about 8 times, at least about 10 times, or even at least about 20 times its original vertical (i.e., 'Z' direction) dimension.

After the web has been expanded a desired amount, the web is passed through a drying station 40 where it is heated and dried, and the binder composition cures. The resulting web is preferably free of rips and tears.

Figure 6:
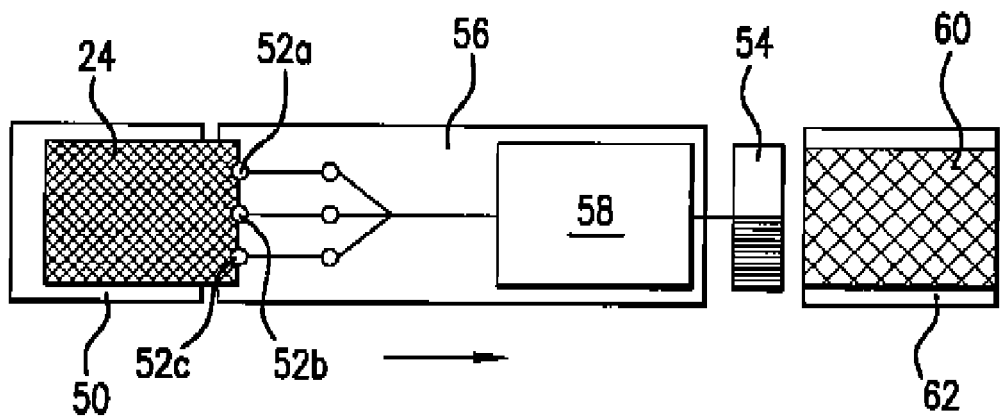
FIG. 6 is a plan view of another embodiment of an expanded wound glass filament web forming process.

FIG. 6 illustrates a web expanding process in which the condensed web 24 is placed on a platform 50 and clamps 52a, 52b, 52c are attached to the leading edge of the web 24. A pulling mechanism 54 is attached to the clamps 52a, 52b, 52c and pulls the web 24 causing the web 24 to expand. The expanding web is supported by a conveyor belt 56 and is pulled through a drying oven 58 where it is heated and dried and where the binder composition dries and cures. The expanded web 60 is then wound up on a roller 62.

Other examples of useful methods of making wound glass filament webs from substantially continuous glass filaments are described in U.S. Pat. Nos. 5,695,848, 5,639,411, 2,546,230, 2,609,320 and 2,964,439 and incorporated herein.

The wound glass filament webs are useful in a variety of applications including, e.g., insulation (e.g., thermal and acoustic), filters (e.g., air filters, furnace filters, air conditioner filters and oven range filters), skylight light diffusion applications, and glass filament reinforced plastics. The wound glass filament webs can be incorporated into a variety of appliances, including, e.g., in the air passage way of an appliance, to filter or condition a fluid (e.g., gas, air and liquid) passing there through. The wound glass filament webs are suitable for use in appliances such as furnaces, air purifiers, air conditioners, oven ranges, oven hoods, range hoods, laboratory hoods, and related applications requiring a high loft, nonwoven batting.

The invention will now be described by way of the following examples. Unless otherwise specified, all amounts are in percent by weight.

EXAMPLES

Test Procedures

Test procedures used in the examples include the following. All ratios and percentages are by weight unless otherwise indicated.

Viscosity Test Method

Viscosity is determined using a Brookfield viscometer at 20 rotations per minute and 25° C. using the appropriate spindle.

Example 1

An aqueous solution polymer of 70/30 glacial acrylic acid/2-hydroxyethyl acrylate (HEA/AA) is prepared by charging 190 g water and 5.6 g solid potassium hydroxide to a reaction vessel and mixing until all of the potassium hydroxide is dissolved. To the reaction vessel is then added 13.2 g 50% hypophosphorous acid over a period of at least 15 minutes with mixing, followed by the addition of 10.4 g isopropyl alcohol, 10.5 g sodium hypophosphite, 19.8 g 50% hypophosphorous acid and 0.04 g ferrous sulfate. The temperature of the reaction vessel is then increased to 70° C. Then a monomer feed of 341.8 g glacial acrylic acid and 161 g 2-hydroxyethyl acrylate is fed into the reaction vessel over a period of five hours and the reaction temperature is maintained at from 80° C. to 90° C. An oxidizer feed of 31.7 g water and 1.33 g 50% hydrogen peroxide and a reducer feed of 31.1 g water and 2.65 g BRUGGOLITE FF6 sodium salt of an organic sulfinic acid derivative (Brüggemann Chemicals Inc., Germany) are also fed to the reaction vessel.

When the redox feeds are complete, the reaction vessel is held at a temperature of from 80° C. to 90° C. for a period of thirty minutes. After 30 minutes, half of the oxidizer treat is added, and after one minute half of the reducer treat is added. After 15 minutes the remaining oxidizer is added and one minute thereafter the remaining reducer is added. After 15 minutes the reaction mixture is cooled to below 35° C. When the composition is below 35° C., caustic soda is added and the composition is recooled to below 35° C.

A first mixture of 8.25 g water and 17 g 50% hydrogen peroxide, and one minute thereafter a second mixture of 8.25 g water and 0.155 g 50% hydrogen peroxide is then added to the reaction vessel, which is maintained at 70° C. The bath is then cooled to below 35° C.

The batch pH is then adjusted with 50% sodium hydroxide solution to a pH of 4.3. KATHON LX 1.5 biocide (Rohm and Hass, Philadelphia Pa.) is then added to the reaction vessel in an amount of 0.93 g. The composition is adjusted with water to a solids content of 52.2% and a viscosity of 550 cps.

Example 2

A water soluble aqueous solution polymer binder composition is prepared according to Example 1 with the exception that the batch pH is adjusted to a pH of 4.8 instead of 4.3.

Example 3

A water soluble aqueous solution polymer binder composition is prepared according to Example 1 with the exception that the batch pH is adjusted to a pH of 4.9 instead of 4.3.

Control 1

A water soluble aqueous solution polymer binder composition is prepared according to Example 1 with the exception that the batch pH is adjusted to a pH of 3.9 instead of 4.3.

The compositions of Examples 1-3 and Control 1 are used as binder compositions in the preparation of a wound glass filament web as follows. The binder composition is sprayed on a plurality of continuous glass filaments as the filaments are wound around a rotating drum as described in U.S. Pat. No. 5,695,848, which is incorporated herein. The resulting condensed web is then cut longitudinally and removed from the drum. The edges along a width of the web is then pulled in a direction transverse to the longitudinal extent of the glass filaments to stretch the web. As the web is pulled it passes through an oven where it was exposed to an average temperature of about 175° C. for a period of 5 minutes to cure the binder composition.

The expected binder pH, amount of binder add on (as measured by loss on ignition (LOI)), thickness, basis weight, expansion, and color of the resulting cured wound glass filament webs are set forth below in Table 1.

TABLE 1

| Sample | pH | Tears and Rips | Color | LOI (%) | Thickness (inches) | Basis weight (g/ft$^2$) | Expansion |
|---|---|---|---|---|---|---|---|
| Control 1 | 3.9 | Yes | Water white | 25 | ND | ND | ND |
| Example 1 | 4.3 | No | Water white | 20 | 2 | 10 | ~600[A] |
| Example 2 | 4.8 | No | Water white | 25 | 2 | 10 | ~600 |
| Example 3 | 4.9 | No | Water white | 25 | 2 | 10 | ~600 |

ND = Not Determined.
~ = approximately
[A] = The expansion is expected to be approximately 40 times the original width of the web.

The webs of Examples 1-3 are expected to be free of tears and rips, to exhibit a uniform nature, and to maintain their integrity when exposed to five minutes of hot steam.

The web of Control 1 is expected to have a number of holes, tears and rips formed during the stretching process.

The patents and publications referred to herein are incorporated herein by reference.

Other embodiments are within the claims.

What is claimed is:
1. A wound glass filament web comprising:
a plurality of layers of glass filaments formed from continuous glass filaments; and
a dry binder composition in contact with the glass filaments and disposed throughout the layers of filaments, the binder composition comprising an acrylo-polyester thermoset resin, the binder composition having been derived from an aqueous binder composition having a pH of at least 4.0,
the wound glass filament web being free from tears and rips.

2. The wound glass filament web of claim 1, wherein the dry binder composition comprises the condensation product of a carboxy functional polymer and a condensation catalyst.

3. The wound glass filament web of claim 1, wherein a majority of the glass filaments extend across a major portion of a major dimension of said web.

4. A filter comprising:
a support; and
the wound glass filament web of claim 1 maintained in a fixed position by said support.

5. The filter of claim 4 further comprising a scrim in facing relation with the web.

6. An appliance comprising:
an air passageway; and
the filter of claim 4 positioned such that air passing through said air passageway contacts the web.

7. The appliance of claim 6 further comprising a furnace, an air purifier, an air conditioner, an oven range hood, a stove hood, a range hood, or a laboratory hood.

8. A method of making the wound glass filament web of claim 1, said method comprising:
adjusting the pH of an aqueous binder composition comprising an aqueous carboxy functional polymer to a pH of at least 4.0; and
contacting the substantially continuous glass filaments with said aqueous binder composition.

9. The web of claim 1, wherein the glass filaments have a length of at least 8 inches.

10. The web of claim 1, wherein the dry binder composition is derived from an aqueous binder composition having a pH of from at least 4 to no greater than 6.

11. The wound glass filament web of claim 1, wherein the web has a loft of at least 3 inches.

12. The wound glass filament web of claim 1, wherein the web has a loft of from about 4 inches to about 8 inches.

13. The wound glass filament web of claim 1, wherein the acrylo-polyester thermoset resin is derived from an active hydrogen functional, carboxy functional polymer.

14. A method of making the wound glass filament web of claim 1, said method comprising:
forming a plurality of said continuous glass filaments;
winding said filaments on a rotating drum to form said plurality of layers of said continuous glass filaments; and
contacting said filaments with an aqueous binder composition having a pH of at least 4.0 and comprising an aqueous carboxy functional polymer and a condensation catalyst.

15. The method of claim 14, wherein said carboxy functional polymer further comprises hydroxy functionality.

16. The method of claim 14, wherein said aqueous binder composition comprises at least one of a polyol, a hydroxy functional amine, and a polyamine.

17. The method of claim 14, wherein said aqueous binder composition comprises from 15% solids to 65% solids and exhibits a viscosity of from 10 centipoise to 2000 centipoise at 25° C.

18. The method of claim 14, wherein said aqueous binder composition has a pH of from 4.2 to about 5.5.

19. The method of claim 14, further comprising
cutting said layers of filaments; and
removing said filaments from said drum in the form of a web.

20. The method of claim 19 further comprising stretching the web such that said web is expanded to an extent that is at least 20 times its original width, said web being free of rips and tears after said stretching.

21. The method of claim 19 further comprising stretching the web, in a direction transverse to the orientation of a majority of the filaments, to form an expanded web.

22. The method of claim 14, wherein said carboxy functional polymer comprises a hydroxy functional, carboxy functional polymer comprising the reaction product of a carboxy functional monomer and a hydroxy functional monomer.

23. The method of claim 22, wherein the hydroxy functional, carboxy functional polymer comprises
a. the reaction product of
i) at least 5% by weight $\alpha,\beta$-ethylenically unsaturated hydroxy functional monomer,
ii) at least 30% by weight ethylenically unsaturated carboxylic acid monomer,
iii) from 0% by weight to less than 50% by weight water insoluble $\alpha,\beta$-ethylenically unsaturated nonhydroxy functional, noncarboxy functional monomer, and
iv) chain transfer agent, and
b. a condensation catalyst.

24. The method of claim 14, wherein said aqueous binder composition has a pH of from 4.2 to no greater than 6.

25. A wound glass filament web comprising:
a plurality of layers of wound glass filaments formed from continuous glass filaments; and
an aqueous binder composition in contact with the glass filaments, the binder composition having a pH of at least 4.0 and comprising an aqueous carboxy functional polymer and a condensation catalyst.

26. The wound glass filament web of claim 25, wherein the web has a loft of at least 0.5 inches.

27. The wound glass filament web of claim 25, wherein the web has a loft of at least 3 inches.

28. The wound glass filament web of claim 25, wherein the web has a loft of from about 4 inches to about 8 inches.

29. A wound glass filament web comprising:
a plurality of layers of substantially continuous glass filaments; and
a dry binder composition in contact with the glass filaments and disposed throughout the layers of filaments, the binder composition comprising an acrylo-polyester thermoset resin, the binder composition having been derived from an aqueous binder composition having a pH of at least 4.0,
the wound glass filament web having been stretched, being free from tears and rips, and exhibiting a loft of at least 0.5 inches.

30. The web of claim 29, wherein the glass filaments have a length of at least 8 inches.

31. The web of claim 29, wherein the dry binder composition is derived from an aqueous binder composition having a pH of from at least 4 to no greater than 6.

32. The web of claim 29, wherein the dry binder composition comprises the reaction product of a carboxy functional polymer and a condensation catalyst.

* * * * *